United States Patent [19]

Knutzen

[11] Patent Number: 5,694,633
[45] Date of Patent: Dec. 2, 1997

[54] CAMERA SYSTEM MODIFIABLE WITH ADDITIONAL FEATURES AND ADAPTED FOR USE BY RIGHT-HANDED OR LEFT-HANDED USERS

[75] Inventor: Hans Hinrich Knutzen, Braunschweig, Germany

[73] Assignee: Rollei Fototechnic GmbH, Braunschweig, Germany

[21] Appl. No.: 714,630

[22] Filed: Sep. 13, 1996

[30] Foreign Application Priority Data

Sep. 15, 1995 [DE] Germany ............... 195 34 231.3

[51] Int. Cl.⁶ .................. G03B 17/02; G03B 29/00
[52] U.S. Cl. .................. 396/541; 396/420; 396/422; 396/428
[58] Field of Search .................. 396/420, 422, 396/424, 425, 428, 535, 540, 541, 544, 373, 383, 354; 348/376

[56] References Cited

U.S. PATENT DOCUMENTS

| | | | |
|---|---|---|---|
| 2,911,894 | 11/1959 | Hennig et al. | 396/541 |
| 3,263,588 | 8/1966 | Robinson | 396/419 |
| 3,295,425 | 1/1967 | Bing et al. | 396/541 |
| 3,913,116 | 10/1975 | Kastner et al. | 396/383 |
| 4,281,909 | 8/1981 | Ishibashi et al. | 396/535 |
| 4,420,240 | 12/1983 | Katsuma et al. | 396/535 |
| 4,624,541 | 11/1986 | Park | 396/541 |
| 4,769,665 | 9/1988 | Dagborn | 396/535 |
| 4,819,016 | 4/1989 | Leonard et al. | 396/535 |
| 5,177,517 | 1/1993 | Schappler et al. | 396/424 |

OTHER PUBLICATIONS

Schaezler, "Geburtstagsgeschenk", Kameratechnik, MFM Jun. 1995, pp. 12–14.
Schaezler, "Die Schwestern aus Tokyo", Kameratechnk, MFM Jun. 1994, pp. 22–24.
"Mamiya RZ67 Professional".
"Die Grosse Mittelformat", Fuji GX 680 Professional.

*Primary Examiner*—A. A. Mathews
*Attorney, Agent, or Firm*—Foley & Lardner

[57] ABSTRACT

A camera system is adaptable as for right-handed and left-handed users and is extendable and modifiable in a versatile fashion. The camera system includes a basic element connected to a lens, a recording housing, and a handle part. The basic element has a through-opening lying along the optical axis of the camera system, a first connecting point on a first side of the through-opening for receiving the lens, a second connecting point on a second side of the through-opening for mounting the recording housing, and a third connecting point whose central axis is arranged perpendicular to the optical axis for connecting the handle part. The basic element is rotatable about the first connecting point and is adapted to be locked into one of three positions, and the recording housing is rotatable about the second connecting point and is adapted to be locked into one of two positions.

21 Claims, 5 Drawing Sheets

CAMERA SYSTEM MODIFIABLE WITH ADDITIONAL FEATURES AND ADAPTED FOR USE BY RIGHT-HANDED OR LEFT-HANDED USERS

BACKGROUND OF THE INVENTION

The invention relates generally to a camera system and, more particularly, to a camera system which is easily adaptable to be equipped with additional features and for use by either left-handed or right-handed persons.

SUMMARY OF THE INVENTION

An object of the invention is to improve the ease of use of conventional cameras.

Another object of the invention is to provide a camera system which can be extended or modified in a versatile fashion.

The above and other objects of the invention are achieved by a camera system which includes a basic element connected to a lens, a recording housing, and a handle part. The basic element has a through-opening lying along the optical axis of the camera system, a first connecting point on a first side of the through-opening for receiving the lens, a second connecting point on a second side of the through-opening for mounting the recording housing, and a third connecting point whose central axis is arranged perpendicular to the optical axis for connecting the handle part. The basic element is rotatable about the first connecting point and is adapted to be locked into one of three positions, and the recording housing is rotatable about the second connecting point and is adapted to be locked into one of two positions.

According to other embodiments of the invention, the recording housing can form a part of a viewfinder camera and can be fitted with different, if necessary, interchangeable viewfinders, for example, a frame viewfinder. Alternatively, the virtually identical recording housing can form part of a mirror-reflex camera and be fitted on its front side with a mirror box which is provided on its top side with different, and, if necessary, interchangeable viewfinders, for example, a prism viewfinder. Finally, it is possible to couple the recording housing to the second connecting point of the basic element via different adapters, for example, a Scheimpflug adapter.

The camera system according to the invention thus offers equally good operability for right-handed and left-handed persons as well as being adaptable to either the horizontal format or the vertical format. Changing from horizontal to vertical format does not require any "regrasping"; all important operating elements remain in their position for the operating hand of the user. Moreover, there are no restrictions to left-handed operation.

An additional interface, with the tolerance deviations which accompany it, is avoided owing to the rotatability of the basic element about the first connecting point, which is preferably designed as a bayonet. The complete separation of the setting and operating elements on the recording housing renders it possible to change simply from an SLR (Single Lens Reflex) to a viewfinder system camera or else to a TLR (Twin Lens Reflex) camera by using the same basic element. Moreover, it becomes possible to change over to a camera having shift and Scheimpflug capabilities without the use of special lenses.

The lens can be chosen from purely optical points of view. There is no need for compromise in the optical design because of the mirror box. The necessary dependence of the brightness of the viewfinder image on the lens speed or of filters is eliminated. Autofocus and measuring viewfinder operation are possible directly in the viewfinder camera function.

The system also permits the use of different back parts, for example, a camera back with manual transport for 35 mm or APS (Advanced Photographic System) film, a camera back with a motor for 35 mm or APS film, an interchangeable magazine with manual transport for 35 mm or APS film, an interchangeable magazine with a motor for 35 mm or APS film, a polaroid magazine or else digital back parts.

In the case of a viewfinder camera system, it is possible to use lenses which project through the through-opening of the basic element and which can thus reach right up to the film plane. The viewfinder can also be interchanged to adapt to the interchangeable lenses. It is also possible to choose different types of shutters.

If the camera system is to be equipped, for example, with a Scheimpflug adapter, the basic element is rotated such that its third connecting point is rotated by about 90° to form the connecting surface for a stand. In the case of this equipment, in particular, the handle part can be designed together with the main setting module as a remote control which can be separated from the basic element.

In order to improve the ease of use, it is expedient when the handle part and the main setting module can be rotated about an axis of the third connecting part which is perpendicular to the optical axis, and can be locked in various rotary positions.

Additional objects, features and advantages of the invention will become apparent from the description of preferred embodiments which follows. The objects and advantages of the invention may be realized and obtained by means of the instrumentalities and combinations particularly pointed out in the appended claims.

BRIEF DESCRIPTION OF THE DRAWINGS

The invention is described in detail herein with reference to the drawings in which.

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

DETAILED DESCRIPTION OF PREFERRED EMBODIMENTS

Figure 1:
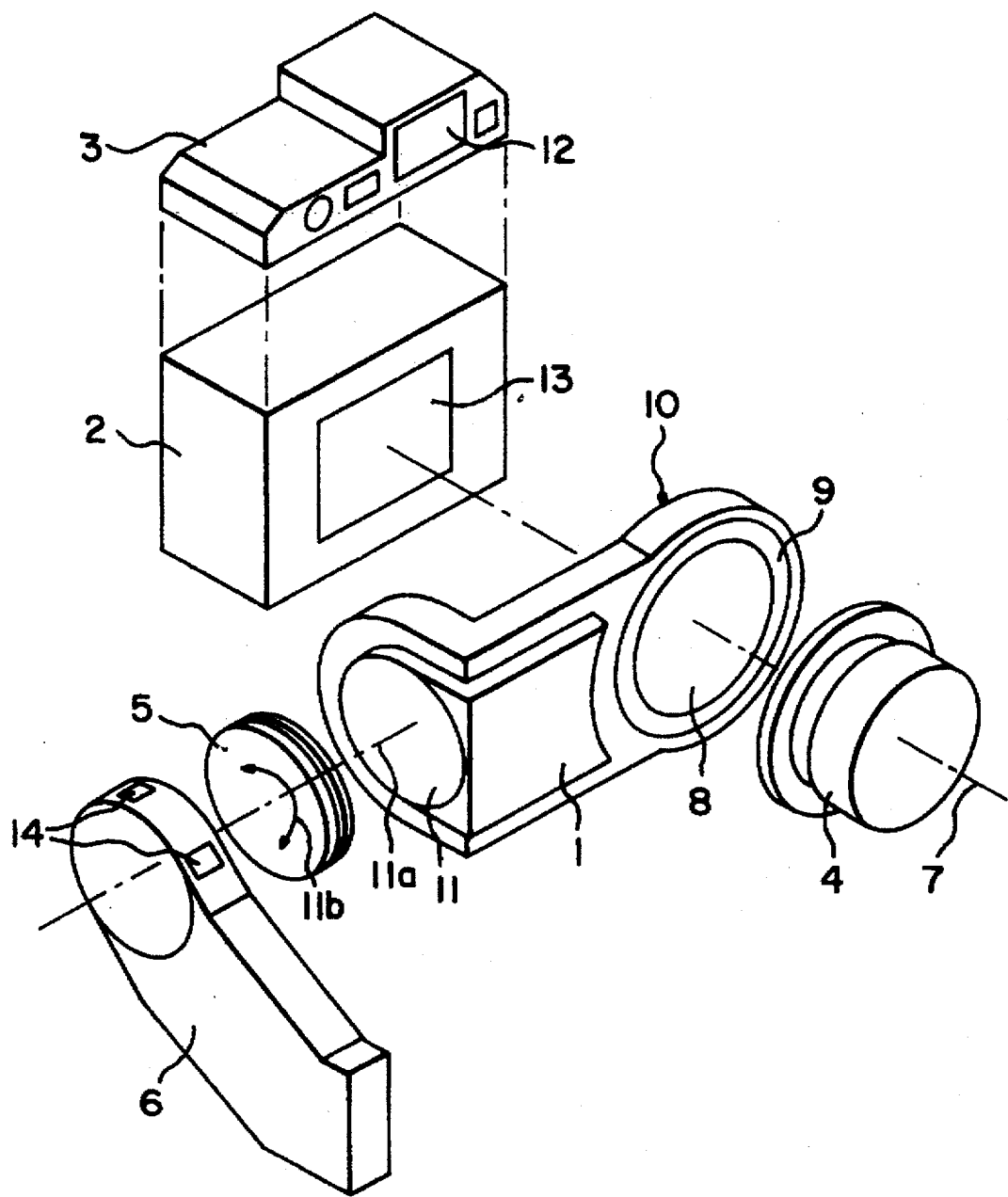
FIG. 1 shows a viewfinder camera which is set up for a right-handed person and whose recording housing is arranged horizontally.
Figure 2:
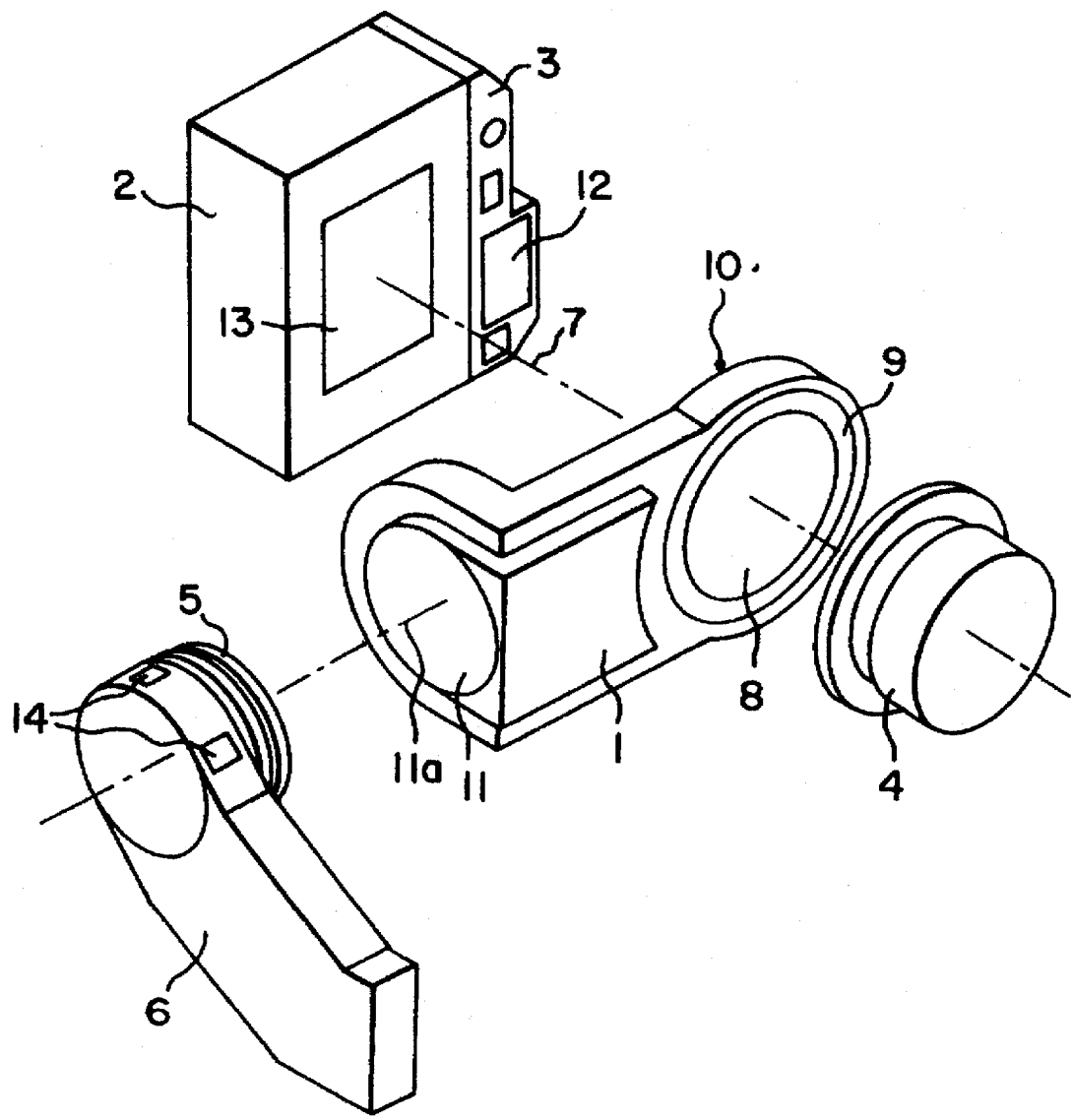
FIG. 2 shows the embodiment in accordance with FIG. 1, but with a recording housing arranged vertically.

The camera system represented in FIGS. 1 and 2 comprises an L-shaped basic element 1, a recording housing 2, a frame viewfinder 3, a lens 4, a main setting module 5, and a handle part 6.

The basic element 1 has a through opening 8 which is situated on the optical axis 7 and has on its front side a first connecting point 9, e.g., a bayonet, for receiving a lens 4, and on its rear side a second connecting point 10 for mounting the recording housing 2. The basic element 1 further has a third connecting point 11 which has an axis 11a perpendicular to the optical axis 7 and to which it is possible to connect the main setting module 5 and the handle part 6 which rotate in accordance with the double arrow 11b (above axis 11a) and can be locked in the respectively desired position.

The basic element 1 can be rotated about its first connecting point 9 and can be locked in two mutually opposite positions and in at least a third position rotated by 90° with respect thereto. The three different preferred positions are represented in FIGS. 1, 4 and 5.

The recording housing 2 forms a part of a viewfinder camera and is fitted with a frame viewfinder 12 which is designed as a detachable fixture. The recording housing 2 can be set or rotated on the second connecting point 10 respectively into at least two positions rotated by 90° with respect to one another about the optical axis 7. FIG. 1 shows one of the two positions, in which the film gate 13 is arranged horizontally. In the representation in accordance with FIG. 2, the recording housing 2 is rotated by 90° from the position represented in FIG. 1 into a vertical position. The connection of the recording housing 2 to the second connecting point 10 is preferably performed via a rotary connection (not shown in more detail) having the two end positions represented in FIGS. 1 and 2.

The main setting module 5 comprises adjusting devices for the shutter speeds and other operating elements, while the handle part 6 has additional operating elements 14 as well as a receiving space (not represented in more detail) for at least one battery.

Figure 4:
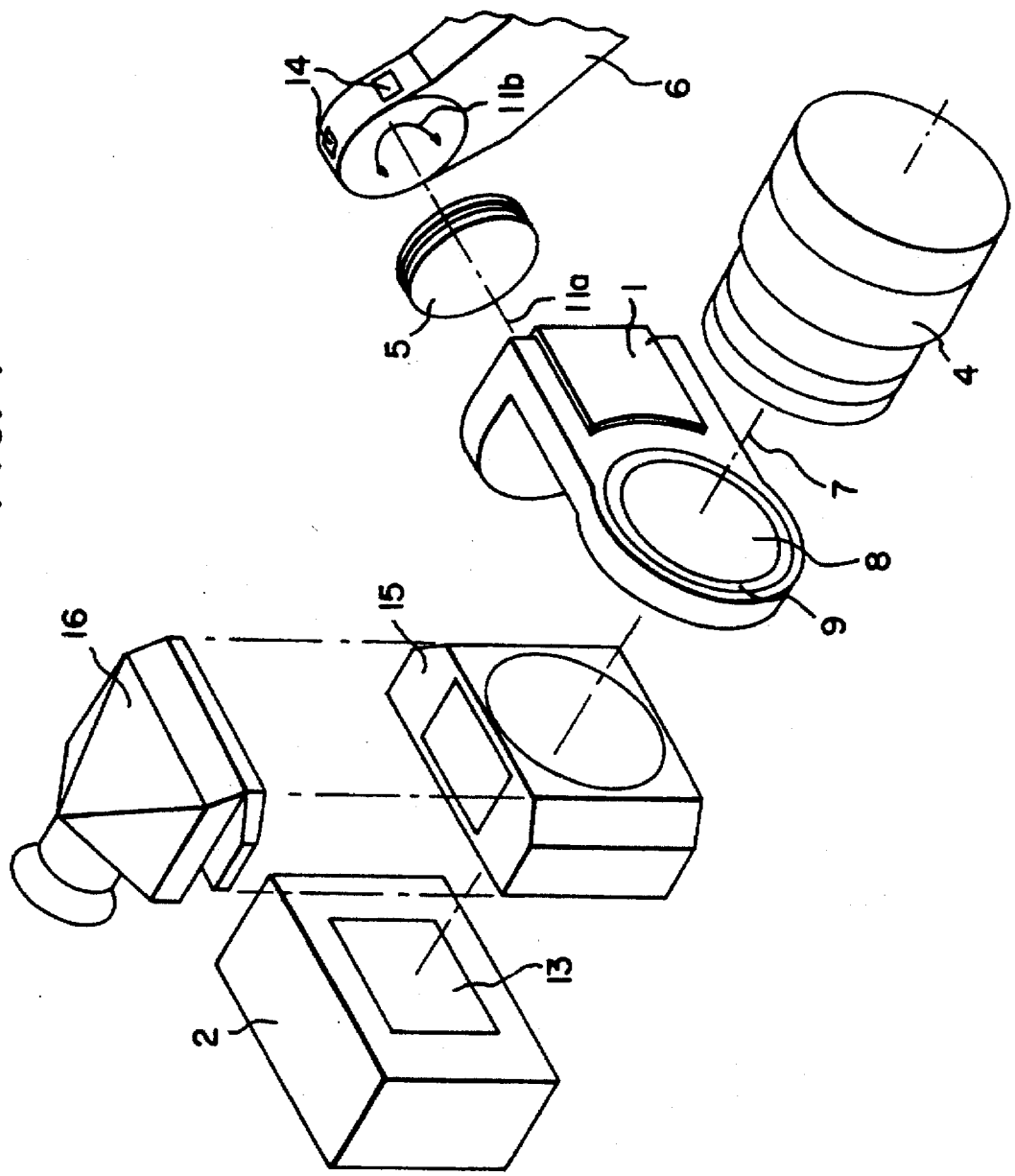
FIG. 4 shows the camera in accordance with FIG. 3, but set up for a left-handed person.
Figure 5:
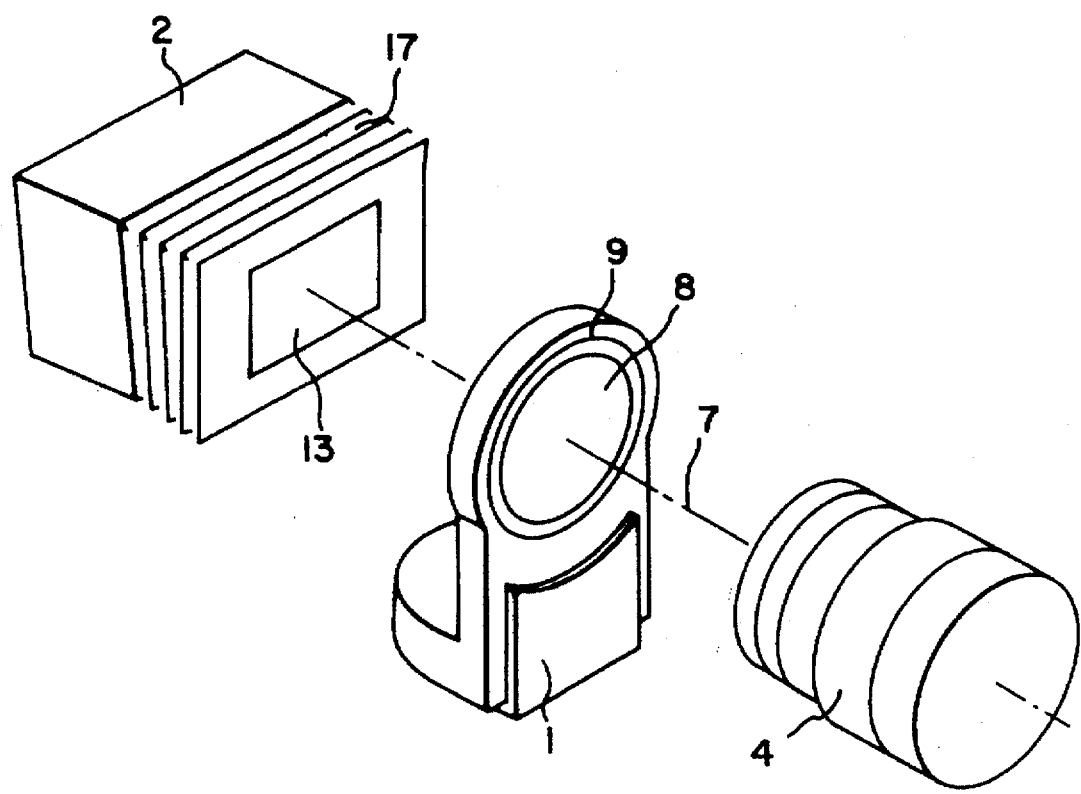
FIG. 5 shows a camera with a Scheimpflug adapter.

In order to change the camera system over for left-handed persons, the basic element 1 is rotated from its position shown in FIG. 1 by 180° about the optical axis 7, or the first connecting point 9 is rotated into the position represented in FIG. 4. In this position, the main setting module 5 and handle part 6 can again be connected to the third connecting point 11.

Figure 3:
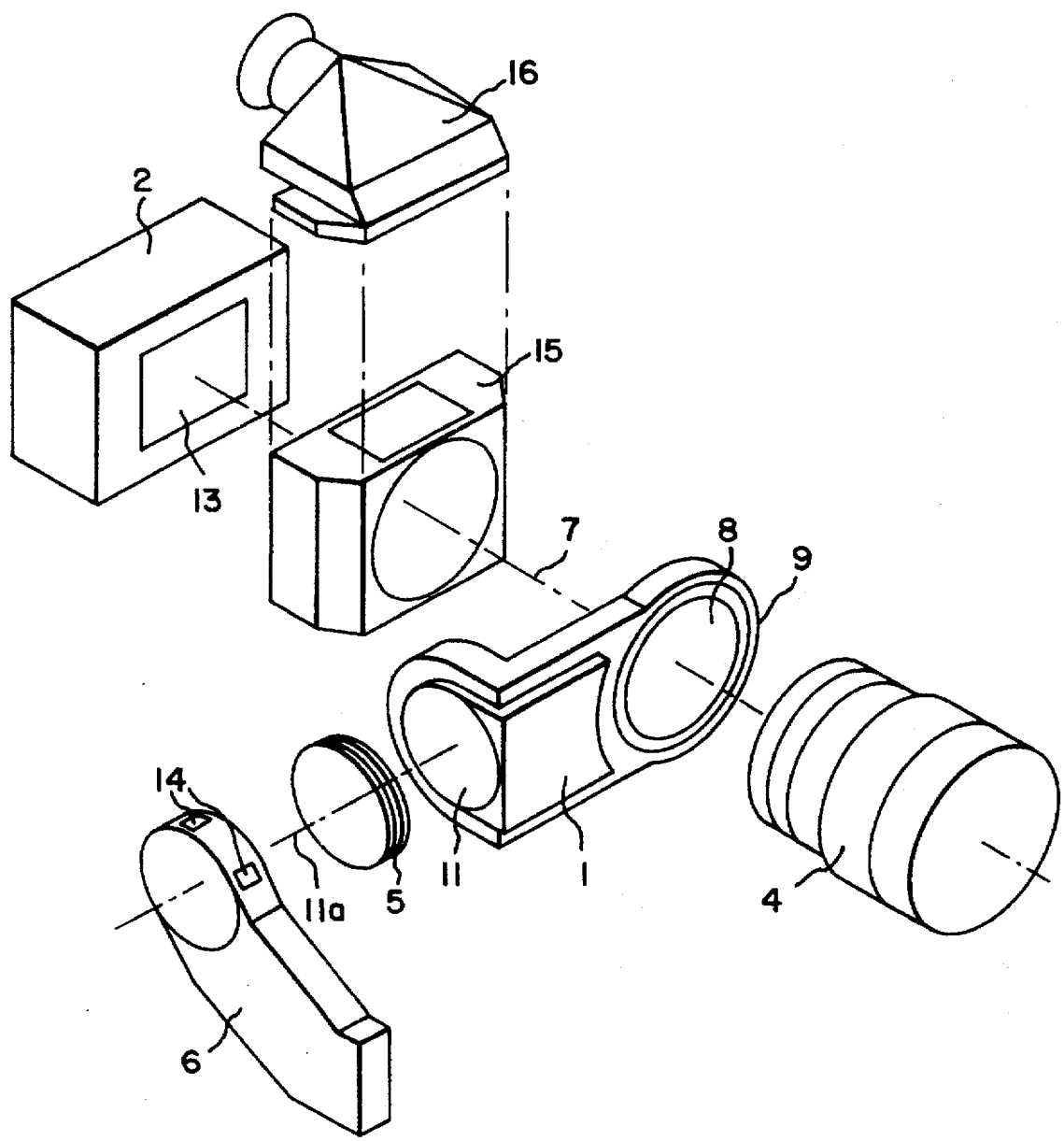
FIG. 3 shows a mirror-reflex camera which is set up for a right-handed person and whose recording housing is arranged horizontally.

The camera system represented in FIGS. 3 and 4 is a mirror-reflex camera whose recording housing 2 bears on its front side a mirror box 15 which is mounted detachably and is fitted on its top side with a detachably mounted prism viewfinder 16. In accordance with FIG. 3, the basic element 1 with its handle part 6 is in the position for right-handed persons, but in the representation in accordance with FIG. 4—rotated by 180° about the optical axis 7—it is in the position for left-handed persons.

In the embodiment in accordance with FIG. 5, the recording housing 2 is coupled via a Scheimpflug adapter 17 to the second connecting point 10 of the basic element 1, which, in contrast to the representation in accordance with FIG. 1, is rotated downward by 90° about the optical axis 7.

While particular embodiments according to the invention have been illustrated and described above, it will be clear that the invention can take a variety of forms and embodiments within the scope of the appended claims.

What is claimed is:

1. A camera system comprising:

a lens;

a recording housing;

a handle part; and a basic element having a through-opening lying along an optical axis of the camera system, a first connecting point on a first side of the through-opening for receiving the lens, a second connecting point on a second side of the through-opening for mounting the recording housing, and a third connecting point whose central axis is arranged perpendicular to the optical axis for connecting the handle;

wherein the basic element is rotatable about the first connecting point and adapted to be locked into one of at least three positions; and wherein the recording housing is rotatable about the second connecting point and adapted to be locked into one of at least two positions.

2. The camera system as claimed in claim 1, wherein the handle part has associated therewith a setting module for setting at least shutter speed.

3. The camera system as claimed in claim 1, wherein the handle part comprises at least one operating element of the camera system.

4. The camera system as claimed in claim 3, wherein the handle part has a coupling portion on opposite sides thereof, the third connecting point being connected to the coupling portion on one of the opposite sides.

5. The camera system as claimed in claim 2, wherein the handle part and the setting module are constructed as a unitary remote control unit which can be separated from the basic element.

6. The camera system as claimed in claim 1, wherein the third connecting point comprises a stand adapter.

7. The camera system as claimed in claim 1, wherein a viewfinder is arranged on the recording housing.

8. The camera system as claimed in claim 7, wherein the viewfinder comprises a frame viewfinder.

9. The camera system as claimed in claim 8, wherein the frame viewfinder is detachable.

10. The camera system as claimed in claim 1, wherein a mirror box is arranged on the recording housing.

11. The camera system as claimed in claim 10, wherein a viewfinder is arranged on the mirror box.

12. The camera system as claimed in claim 11, wherein the viewfinder comprises a prism viewfinder.

13. The camera system as claimed in claim 12, wherein the mirror box is detachable.

14. The camera system as claimed in claim 13, wherein the viewfinder is detachable.

15. The camera system as claimed in claim 1, further comprising a Scheimpflug adapter arranged between the recording housing and the second connecting point.

16. The camera system as claimed in claim 1, wherein the basic element is L-shaped.

17. The camera system as claimed in claim 1, wherein the handle part and the main setting module are rotatable about an axis perpendicular to the optical axis and can be locked in a desired position.

18. The camera system as claimed in claim 1, wherein two of the three positions of the basic element are diametrically opposite positions and the third position is rotated 90° with respect thereto, and wherein the two positions of the recording housing lie at 90° with respect to each other.

19. The camera system as claimed in claim 18, wherein one of the three positions of the basic element is a vertical position and two of the three positions are horizontal positions, and wherein a first of the two positions of the recording housing is a vertical position and a second of the two positions is a horizontal position.

20. The camera system as claimed in claim 3, wherein the handle part has a receiving space for at least one battery.

21. A camera system comprising:

a lens;

a recording housing;

a handle part; and a basic element having a through-opening lying along an optical axis of the camera system, a first connecting point on a first side of the through-opening for receiving the lens, a second connecting point on a second side of the through-opening for mounting the recording housing, and a third connecting point whose central axis is arranged perpendicular to the optical axis for connecting the handle part;

wherein the basic element is rotatable about the first connecting point and can be locked into a right-handed arrangement in which a first side of the handle part is connected to the third connecting point and a left-handed arrangement in which a second side of the handle part, opposite to the first side, is connected to the third connecting point.

* * * * *